UNITED STATES PATENT OFFICE.

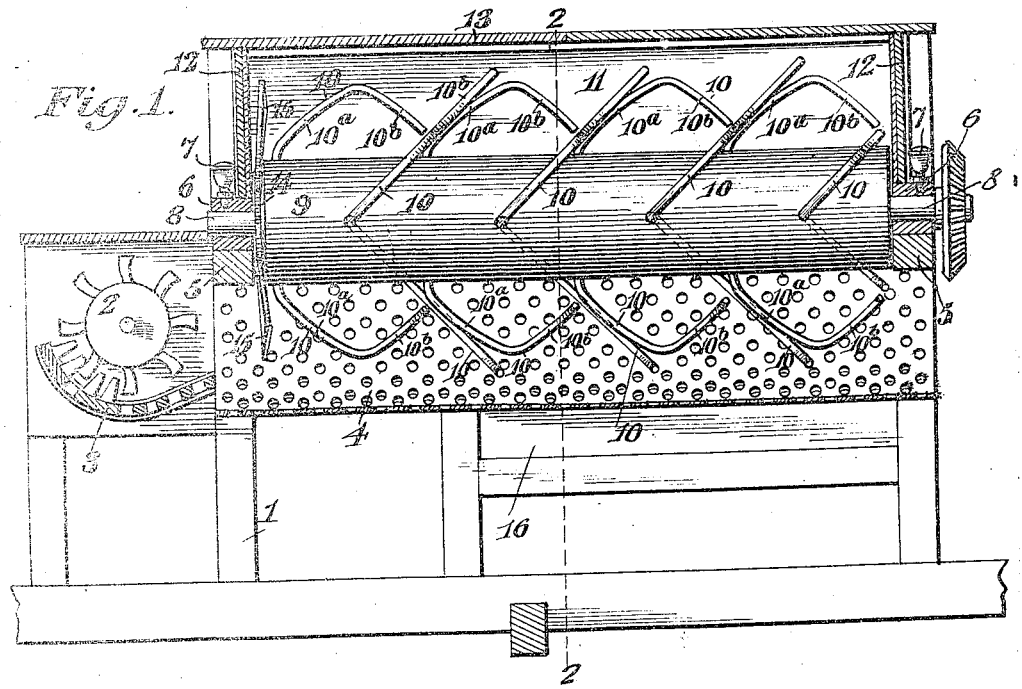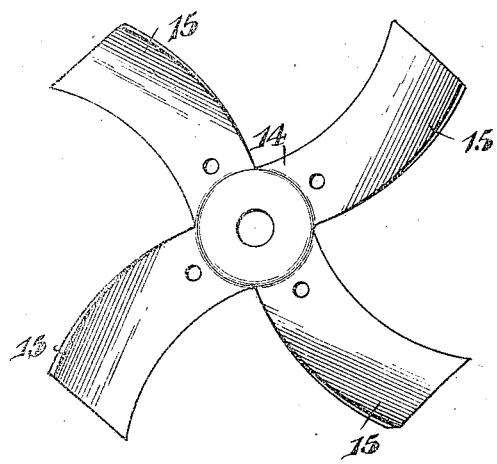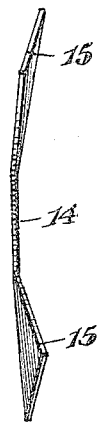

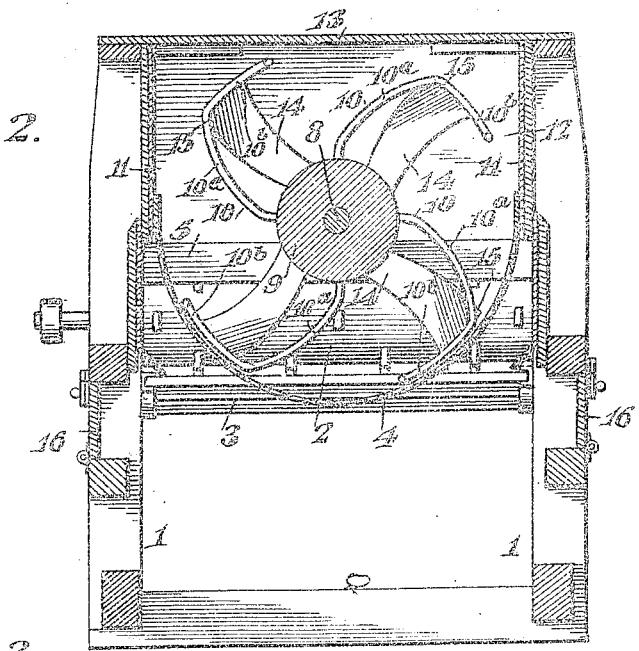
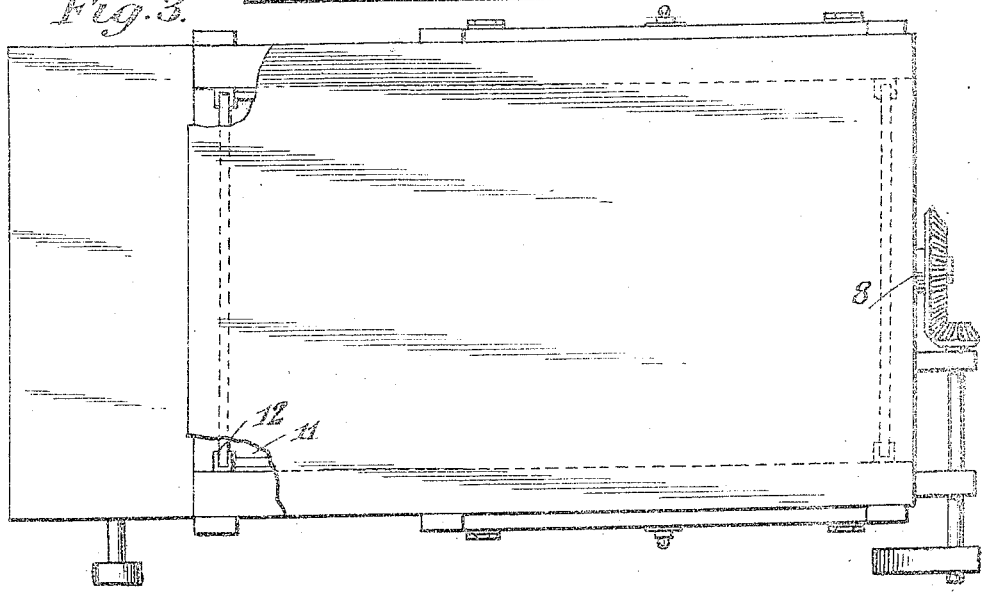

SIMON M. O. BANGEN, OF CROOKSTON, MINNESOTA.

GRAIN-SEPARATOR FOR THRESHING-MACHINES.

1,193,751.    Specification of Letters Patent.    Patented Aug. 8, 1916.

Application filed April 30, 1915. Serial No. 25,011.

*To all whom it may concern:*

Be it known that I, SIMON M. O. BANGEN, a citizen of the United States, residing at Crookston, in the county of Polk and State of Minnesota, have invented a new and useful Grain-Separator for Threshing-Machines, of which the following is a specification.

This invention has reference to grain separators for threshing machines, and its object is to provide a structure for the purpose which shall be of smaller dimensions, simpler mechanism, easier and requiring less power to operate, will last longer, be cheaper to manufacture, and which will do better and more work in a given time than many of the grain separators now in use and on the market.

In accordance with the present invention the grain separating portion of the thresher comprises a straw engaging rotary member and a screen underlying said rotary member with the parts constructed and coupled up to the driving power for rotation at a speed whereby the straw and grain delivered by the threshing cylinder is agitated and moved over the screen in a manner to thoroughly separate the grain from the straw, which latter freed from grain is ultimately discharged from the machine.

The straw after leaving the threshing cylinder is delivered directly upon the screen where it is first engaged by a rotating series of blades serving to collect the straw as it is delivered by the threshing cylinder and in turn direct the straw upon the rotatable beater having series of fingers or prongs of sufficient length and curvature to throw the straw from one tooth or prong to the next along the entire length of the rotor. This action, which is relatively slow, is sufficiently prolonged to insure the thorough separation of the grain from the straw and the directing of the grain through the screen located beneath and at the sides of the rotor, while the straw itself is finally discharged from that end of the machine remote from the threshing cylinder.

The rotor is driven at a slow speed as compared to the speeds usually employed and all auxiliary devices, such as fans and the like, or any means for producing blasts or streams of air, are omitted and are in fact wholly unnecessary and detrimental.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings: Figure 1 is a longitudinal vertical section of a separator constructed in accordance with my invention and showing so much of the thresher as is necessary for an understanding of the device, all other parts of the thresher being omitted. Fig. 2 is a section on the line 2—2 of Fig. 1. Fig. 3 is a plan view of the structure of Fig. 1 with some parts broken away. Fig. 4 is an elevation of the gatherer. Fig. 5 is an edge view of the gatherer.

Referring to the drawings there is shown a frame 1 which may be considered as adapted to sustain various mechanisms employed in a threshing machine, without, however, any attempt to show a frame adapted to any particular type of threshing machine, since the invention may be variously modified without departure from the spirit thereof.

At one end there is mounted a threshing drum 2 which may be considered as having associated therewith the usual concave 3. In line with the discharge side of the cylinder 2 is a screen 4 shown as approximately semi-circular in cross-section and considerably elongated. This screen may be made of perforated metal, as indicated in the drawings, or may be made in any other way or of other material and may be otherwise shaped than shown.

Mounted on suitable cross pieces 5 of the main frame are journal bearings 6 each supplied with a lubricant receptacle 7 in position to be readily accessible for filling. In the journal bearings or boxes 6 are journaled the end portions of a shaft 8 extending lengthwise of the machine above the bottom of and in suitable relation to the screen 4. The shaft 8 is shown as carrying an elongated cylinder 9, but this may be taken as indicative of any kind of a support for series of fingers or prongs 10, which series extend longitudinally of the shaft 8 and cylinder or hub 9 within the space between the bearings 6.

Rising from the sides of the screen 4 are upright walls 11 and rising from cross beams 5 are upright end walls 12, and above these side and end walls is a cover 13. The ends of the screen 4 are, however, free from closing walls, so that straw and grain from the threshing cylinder have free entrance thereinto and straw has free escape from the other end of the screen. The fingers 10 project laterally of the longitudinal radial plane in which the particular series to which they belong is located, at an angle thereto which may approximate forty-five degrees, but such angle is susceptible of variation. Each finger is bent toward the discharge end of the separator first away from the cylinder or hub 9, as shown at 10$^a$, and then toward said cylinder or hub, as shown at 10$^b$, and this double bend, together with the general trend of the fingers or prongs toward the discharge end of the separator causes the fingers or prongs to engage the straw in such a manner as to both lift the straw and propel it toward the discharge end of the separator.

At that end of the shaft 8 or hub 9 adjacent to the threshing cylinder there is made fast thereto a series of flat arms or blades 14, which in the particular showing of the drawings are four in number, but may, of course, be of other number. These blades are preferably given a slight trend at their outer ends toward the discharge end of the machine, and also a slight twist, such outer ends being indicated at 15. The arms or blades 14 serve to receive the straw as it comes from the threshing cylinder and direct it to the fingers or prongs 10 so that the latter may receive the straw with the grain therein and in turn propel the straw toward the discharge end, throwing such straw from one finger or prong to the next along the length of the hub or cylinder.

The revolving series of fingers in the substantially half circular screen causes the straw to be agitated, spread, scattered, and thrown about, while being constantly propelled toward the discharge end of the machine. The straw is moreover thrown around the cylinder or hub, which together with the fingers may be termed the rotor, several times before it escapes from the machine, and this gives ample opportunity for the grain to fall out of the straw and down into suitable grain pans which may be located beneath the screen 4, but which are not shown, since such devices are in common use in separators. Doors 16 on opposite sides of the machine and opening downwardly are provided to facilitate the introduction and removal of screens in the cleaning part of the machine, but the cleaning devices are not shown in the drawings.

The shaft 8 with the rotor carried thereby is driven at a relatively slow speed which is too slow to produce any marked air currents. It is to be understood that the blades 14 are not fan blades, and are not intended to cause any active streams of air, but are solely intended to receive the straw from the threshing cylinder and properly distribute it to the propelling fingers 10 carried by the separator cylinder or hub.

The separator of the present invention consists solely of the rotatable series of propelling fingers shaped to lift and agitate the straw, the distributing blades at the entrance end of the separating chamber and the screen underriding the separating cylinder and forming the lower part of the separating chamber, the parts being associated with the threshing cylinder to receive the threshed grain at one end of the screen at a point lower than the axis of the separating cylinder, and to discharge the straw freed from grain at the other end of the machine.

Such a separator has been found to be highly efficient in actual practice, and has been also found to wholly eliminate any necessity of fans or air moving means producing streams of air. Moreover, the separation of the grain from the straw has been found to be particularly thorough while the mechanism needed for the purpose is reduced to a minimum. This means low cost of manufacture and low cost of operation with the attainment of a result equal or superior to the results obtained by other separators, wherein relatively high speed of the agitator and fans or other air stream producing mechanism has been employed.

What is claimed is:

1. A grain separator for threshing machines comprising a rotor having straw propelling fingers thereon, a straw directing device at the receiving end of the propelling means and constituting a part of the rotor, a screen underriding the propelling means, and means for driving the rotor at a relatively slow speed as compared with the speed of the threshing cylinder.

2. A grain separator for threshing machines, comprising an elongated rotor having longitudinal series of straw engaging fingers or prongs thereon directed toward the discharge end of the separator at an angle to the length of the respective series, means at the receiving end of the separator for distributing the straw to the fingers, a screen in underriding relation to the rotor and having extensions rising at the sides of the rotor, and means for feeding the straw to the bottom portion of the receiving end of the screen.

3. A grain separator for threshing machines, comprising an elongated rotor having longitudinal series of straw engaging fingers or prongs thereon directed toward the discharge end of the separator at an angle to the length of the respective series, means on and fast to the rotor and confined solely to the receiving end of the separator for distributing the straw to the fingers, and a screen in underriding relation to the rotor and having extensions rising at the sides of the rotor, said screen having a threshing cylinder associated therewith to deliver the threshed grain to that end of the screen provided with the straw directing means at a point below the axis of rotation of the rotor.

4. A grain separator for threshing machines comprising an elongated screen curved in cross-section and adapted to receive threshed grain at one end and discharge the straw at the other end, and a straw propelling and agitating means comprising a rotor in substantially concentric relation to the screen, said rotor having straw engaging fingers or prongs bowed away from the axis of rotation and arranged in longitudinal series with each finger at an angle to the length of the axis of rotation with the free end of the finger more distant from the receiving end of the separator than the other end of the finger, and directing means for the straw at the receiving end of the separator comprising a circular series of blades participating in the movements of the rotor and each having the outer end twisted in a direction to engage and distribute the stray to the propelling fingers.

In testimony that I claim the foregoing as my own I have hereto affixed my signature in the presence of two witnesses.

SIMON M. O. BANGEN.

Witnesses:
 O. O. CHRISTIANSON,
 T. T. MORKEN.